United States Patent [19]

Mirolli

[11] 3,875,122

[45] Apr. 1, 1975

[54] CROSS-LINKING EPIHALOHYDRIN POLYMERS

[75] Inventor: Joseph E. Mirolli, Beaumont, Tex.

[73] Assignee: Hercules Incorporated, Wilmington, Del.

[22] Filed: May 15, 1973

[21] Appl. No.: 360,692

[52] U.S. Cl. ..... 260/78.4 D, 260/18 EP, 260/37 EP, 260/45.7 R
[51] Int. Cl. ............................................ C08g 23/20
[58] Field of Search ...... 260/78.4 D, 78.4 EP, 2 EP, 260/2 A, 2 EC, 2 N, 2 BP, 18 EP

[56] References Cited
UNITED STATES PATENTS

| 3,239,486 | 3/1966 | Willis | 260/45.75 |
| 3,341,491 | 9/1967 | Robinson et al. | 260/45.75 |
| 3,726,841 | 4/1973 | Mirolli et al. | 260/79 |

Primary Examiner—Harry Wong, Jr.
Assistant Examiner—John Kight, III
Attorney, Agent, or Firm—Marion C. Staves

[57] ABSTRACT

Epihalohydrin polymers and copolymers can be cross-linked with a polycarboxyplate polyanion having the formula

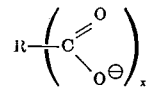

where R is a radical selected from $C_1-C_{10}$ alkylene, phenylene, $C_4-C_9$ cycloalkylene and the hydrocarbon radical remaining after the removal of the carboxylic acid groups from the dimer and trimer acids of $C_6-C_{20}$ diunsaturated fatty acids, and x is an integer from 2 to 4. The cross-linking can be accomplished by heating the polymer with one of the following agents or mixtures of agents which yield polycarboxylate polyanions:

1. quaternary ammonium salts of the polycarboxylic acids
2. a mixture of the polycarboxylic acid, certain lead compounds and quaternary ammonium halides
3. a mixture of an alkali metal salt of the polycarboxylic acid and a small amount of the quaternary ammonium salt of the polycarboxylic acid.

8 Claims, No Drawings

CROSS-LINKING EPIHALOHYDRIN POLYMERS

The present invention relates to cross-linking epihalohydrin polymers and to the polymers so cross-linked. More particularly, this invention relates to cross-linking epihalohydrin polymers with polycarboxylate polyanions.

Epihalohydrin polymers have been cross-linked, i.e., vulcanized, in the past using various agents, such as polyamines, urea, thiourea and certain heterocyclic compounds in combination with various metal compounds to produce elastomers that have numerous good attributes.

It has now unexpectedly been found that polymers and copolymers of epihalohydrins can be cross-linked with a polycarboxylate polyanion having the formula

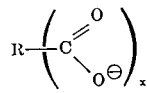

where R is a radical selected from the group consisting of $C_1$–$C_{10}$, most preferably $C_4$–$C_{10}$ alkylene, phenylene, $C_1$–$C_9$ cycloalkylene and the hydrocarbon radical remaining after the removal of the carboxylic acid groups from the dimer and trimer acids of $C_6$–$C_{20}$ diunsaturated fatty acids, and $x$ is an integer from 2 to 4.

Any solid polymer, homopolymer or copolymer of an epihalohydrin, as, for example, epichlorohydrin, epiiodohydrin, or epibromohydrin homopolymers, copolymers of two different epihalohydrins, or copolymers of an epihalohydrin with one or more other epoxides or oxetanes can be cross-linked in accordance with this invention. These polymers are readily prepared by the polymerization of epihalohydrins with, for example, organoaluminum compounds as catalysts. Particularly effective catalysts for the polymerization of epihalohydrins are alkylaluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates, the crystalline polymers on vulcanization tending to be hard, brittle, and lacking in elasticity. These properties are, of course, useful in the case of relatively rigid molded articles which can be prepared by molding the compounded polymer and then curing to cross-link and set it. However, excellent rubbers are obtained by vulcanizing mixtures of amorphous and crystalline polymers. In this case, the amount of the crystalline polymer is generally less than about 25–30% of the mixture.

When epihalohydrins are polymerized by the above process, polymerization takes place at least in major part through the epoxide linkage so that the product is a polyether containing halomethyl groups attached to the main polymer chain. The homopolymers are believed to have the following general formula

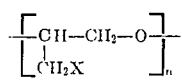

where X is halogen. In the same way, when an epihalohydrin is copolymerized with one or more other epoxides or oxetanes (including other epihalohydrins), polymerization takes place through the epoxide or oxetane linkage even though other polymerizable groups may be present. Typical of epoxides and oxetanes that can be copolymerized with an epihalohydrin to produce a copolymer that can be cross-linked in accordance with this invention are the alkylene oxides such as ethylene oxide, propylene oxide, butene oxide, etc.; butadiene monoxide, cyclohexene oxide, vinyl cyclohexene oxide, epoxide ethers such as ethyl glycidyl ether, 2-chloroethyl glycidyl ether, hexyl glycidyl ether, allyl glycidyl ether, etc.; trimethylene oxide (oxetane), alkyl substituted oxetanes, such as 2-ethyloxetane, 3-butyloxetane, 3,3-dimethyloxetane, etc.; haloalkyl substituted oxetanes such as 2-chloromethyloxetane, 3-iodopropyloxetane, etc.; alkoxy substituted oxetanes such as 2-ethoxyoxetane, 3-propoxyoxetane, etc.; alkoxyalkyl substituted oxetanes such as 2-butoxymethyloxetane, 3-hexoxymethyloxetane, etc.; haloalkoxy substituted oxetanes such as 2-bromobutoxyoxetane; 3-fluoromethoxyoxetane, etc.; haloalkoxyalkyl substituted oxetanes such as 2-chloroethoxymethyloxetane, 3-fluoromethoxymethyloxetane, etc. The copolymers will in general contain at least about 10% by weigth of an epihalohydrin monomer.

The polymers of an epihalohydrin that are cross-linked, i.e., vulcanized, in accordance with this invention, are high molecular weight solid polymers. Any homopolymer or copolymer that has a Reduced Specifid Viscosity (RSV) of at least about 0.2, i.e., a molecular weight of at least about 40,000, can be cross-linked with the agents of this invention to yield a polymer of increased tensile strength and modulus. The term RSV, which is a function of molecular weight, is used herein to designate the specific viscosity measured at 100°C. on an α-chloronaphthalene solution of the polymer containing 0.1 g. per 100 ml. of solution divided by the concentration of the solution. Polymers having an RSV above about 0.2, and preferably above about 0.5, on cross-linking yield excellent general purpose specialty rubbers.

These epihalohydrin polymers generally contain a small amount (i.e., from about 0.1% to about 2% by weight) of anti-oxidant added at the time of their preparation. It may in some cases be desirable to add a small additional amount of antioxidant before or at the time of cross-linking the polymer. Exemplary of the most preferable antioxidants are phenyl-β-naphthylamine, di-β-naphthyl-p-phenylenediamine, syn-di-β-naphthyl-p-phenylenediamine, N-isooctyl-p-aminophenol, the reaction product of diphenylamine and acetone, polymerized trimethyldihydroquinoline, 4,4'-thio-bis(6-tert-butyl-m-cresol), the reaction product of crotonaldehyde and 3-methyl-6-tert-butylphenol, nickel -dibutyldithiocarbamate, the zinc salt of 2-mercaptobenzimidazole, etc.

Epihalohydrin polymers are cross-linked in accordance with this invention by heating a mixture of the polymer with one or more agents which yield polycarboxylate polyanions.

In one modification of this invention, the polymer is admixed and then heated with a quaternary ammonium salt of a polycarboxylic acid having the formula

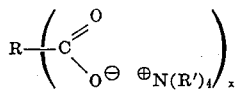

where R' is selected from $C_1$-$C_8$ alkyl and $C_5$-$C_9$ cycloalkyl and R and $x$ are as defined above. Typical quaternary ammonium salts of polycarboxylic acids which yield polycarboxylate polyanions when heated in admixture with an epihalohydrin polymer are bis(tetraethylammonium) malonate; bis(cyclopentyltrimethylammonium) succinate; bis(tetrabutylammonium) adipate; bis(tetramethylammonium) azelate; bis(tetraethylammonium) dodecanedioate; tris(tetramethylammonium) 1,3,5-pentanetricarboxylate; bis(hexyltrimethylammonium) adipate; tetrakis(tetramethylammonium) 1,2,3,4-cyclopentanetetracarboxylate; bis(tetraethylammonium) 1,4-cyclohexanedicarboxylate; bis(tetrabutylammonium) phthalate; bis(octyltrimethylammonium) isophthalate; bis(dimethylmorpholinium) azelate; bis(cyclohexyldiethylmethylammonium) suberate; bis(cyclononyltrimethylammonium) pimelate; and the bis(tetramethylammonium) salt of the dimer acid having the formula

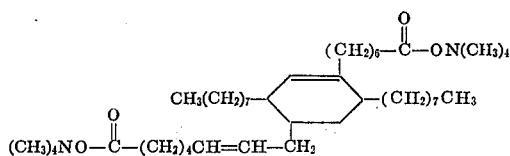

In another modification of this invention, the polymer is admixed and then heated with (1) a polycarboxylic acid having the formula

where R and x are as defined above, (2) a lead compound selected from the lead salts of aromatic carboxylic acids, the lead salts of aliphatic carboxylic acids, the lead salt of carbonic acid, the lead salt of phosphorous acid, the lead salt of silicic acid and the lead oxides, and (3) a quaternary ammonium halide having the formula

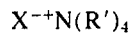

where X is a halide radical selected from chloride, bromide and iodide and R' is as defined above. It is believed that the polycarboxylic acid and quaternary ammonium halide when heated in the presence of the lead compound form the quaternary ammonium salt of the polycarboxylic acid, which in turn yields the polycarboxylate polyanion. Typical polycarboxylic acids that can be used in the above modification are malonic acid, succinic acid, adipic acid, pimelic acid, suberic acid, azelaic acid, sebacic acid, dodecanedioic acid, 1,3,5-pentane tricarboxylic acid, terephthalic acid, isophthalic acid, trimellitic acid, trimesic acid, pyromellitic acid, 1,3-cyclobutane dicarboxylic acid, 1,3-cyclopentene dicarboxylic acid, 1,2,3,4-cyclopentane tetracarboxylic acid, 1,4-cyclohexane dicarboxylic acid, 1,3,5-cyclohexane tricarboxylic acid, 1,2,4,5-cyclohexane tetracarboxylic acid, 1,4-cycloheptane dicarboxylic acid, 1,3,5-cycloheptane tricarboxylic acid, 1,5-cyclooctane dicarboxylic acid, 1,5-cyclononane dicarboxylic acid, and the dimer and trimer acids prepared by the polymerization of unsaturated fatty acids, such as palmitolic acid, linoleic acid, eicosinic acid, etc. Typical quaternary halides that can be used in the above modification are methyltributylammonium iodide, tetrabutylammonium bromide, hexyltrimethylammonium bromide, tetramethylammonium bromide, tetraethylammonium chloride, octyltrimethylammonium bromide, cyclopentyltrimethylammonium bromide, cyclohexyldiethylmethylammonium bromide, dimethylmorpholinium iodide, and cyclononyltrimethylammonium iodide. Typical lead compounds that can be used in the above modification are dibasic lead phthalate, lead oleate, lead adipate, dibasic lead stearate, the lead salt of carbonic acid, the lead salt of phosphorous acid, the lead salt of silicic acid, lead monoxide and red lead oxide. The polycarboxylic acid and quaternary ammonium halide can be present in various molar ratios. However, for best results, a ratio of about one mole of quaternary ammonium halide per mole of carboxyl group will be used. The lead compound will be present in an amount of from about 0.1% to about 20% by weight based on the polymer.

In still another modification of this invention the polymer is admixed and then heated with (1) an alkali metal salt of a polycarboxylic acid having the formula

where M is an alkali metal, such as lithium, sodium or potassium, and R and $x$ are as defined above, and (2) a relatively small amount of a quaternary ammonium salt of a polycarboxylic acid having the formula

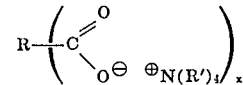

where R, R' and x are as defined above. It is believed that the quaternary ammonium salt helps to solubilize the alkali metal salt of the polycarboxylic acid in the polymer so that it may ionize forming the polycarboxylate polyanion. As little as 10 mole % of the quaternary ammonium salt, based on the total moles of polyanion cross-linkers (alkali metal salt plus quaternary ammonium salt), is effective. Generally, from about 10 mole % to about 50 mole % of the quaternary ammonium salt, based on the total moles of polyanion cross-linkers will be used. It will be understood that even larger percentages of the quaternary ammonium salt can be used but no advantages will be obtained therefrom. Typical alkali metal salts of polycarboxylic acids that can be used in the above modification are disodium adipate, disodium azelate, dipotassium malonate, dilithium sebacate, dipotassium azelate, the disodium salt of the dimer acid of linoleic acid, trisodium 1,3,5-pentanetricarboxylate, dipotassium terephthalate, dilithium phthalate, disodium 1,4-cyclohexanedicarboxylate, and tripotassium 1,3,5-cycloheptanetricarboxylate. Typical quaternary ammonium salts of polycarboxylic acids are listed above.

The amount of polycarboxylate polyanion used in the cross-linking process of this invention will vary, depending upon the specific polycarboxylate polyanion being employed and the amount of cross-linking required. The amount of cross-linking required to produce a vulcanized epihalohydrin elastomer (i.e., rubber) will naturally be less than the amount required to produce a hard plastic. In general, from about 0.0025 gram mole to about 1.0 gram mole, most preferably from about 0.0075 gram mole to about 0.02 gram mole, of the polyanion per 100 grams of polymer will be used for cross-linking in accordance with this invention.

As indicated above, cross-linking in accordance with this invention is initiated by heating the polymer in admixture with one or more agents which will yield the necessary amount of polycarboxylate polyanion. Various temperatures, below the decomposition point of the polymer, can be used. In general, the cross-linking temperature will be in the range of from about 200°F. to about 400°F. The amount of time required to effect cross-linking will vary inversely with the temperature. In general, the amount of time will be from about 1 minute to about 60 minutes.

In addition to the cross-linking agents (i.e., polycarboxylate polyanion producers) it may be desirable to also admix with the polymer one or more metallic stabilizers, particularly lead stabilizers. The most preferred stabilizers are the lead compounds recited above, particularly red lead oxide. Therefore, it may be desirable to add at least a small amount, i.e., from about 0.2% to about 5.0% by weight, based on the weight of the polymer, of a lead stabilizer, although even larger amounts may be used. It will, of course, be recognized that there are cases in which a metallic stabilizer is not desired and excellent vulcanizates can be obtained without it.

Besides the cross-linking agents and metallic stabilizers, still other ingredients may be incorporated. In certain cases, it may be desirable to use one or more of the additives commonly used in rubber vulcanizates, such as extenders, fillers, pigments, plasticizers and softeners. The presence of a filler and, in particular, carbon black, may be beneficial, as in rubber compounding. Obviously, there are many cases in which a filler, extender, plasticizer, etc., is not required or desired and excellent results are achieved when only the cross-linking agent is used.

The cross-linking agents (stabilizers and other additives — if they are used) can be incorporated or admixed with the polymer in any desired fashion; for example, they can be uniformly blended with a polymer by simply milling on a conventional rubber mill or mixing in a Banbury mixer. By this means, the agents are uniformly distributed throughout the polymer and uniform cross-linking is effected when the blend is subjected to heat. Other methods of admixing the cross-linking agents with the polymer will be apparent to those skilled in the art.

In addition to improving the physical properties of epihalohydrin polymers, cross-linking with polycarboxylate polyanions has been found to greatly increase the adhesion of epihalohydrin polymers to polyesters, particularly poly(ethylene terephthalate). In the past, the use of polyester cords or fibers to reinforce epihalohydrin rubber articles was plagued by poor adhesion between the polyester and the rubber. Now it has been found that polyester reinforced epihalohydrin rubber having good adhesion between the epihalohydrin rubber and polyester can be prepared by cross-linking the rubber with a polycarboxylate polyanion while in contact with the polyester reinforcement. This improvement can be accomplished using various methods. One method which may be used is to coat the polyester cord or fiber with a solution of the epihalohydrin rubber and an agent which yields polycarboxylate polyanions, remove the solvent and heat to effect cross-linking. The resulting rubber coated cord or fiber can then be embedded in epihalohydrin rubber to yield articles having excellent reinforcing properties.

The following examples will illustrate the process of cross-linking epihalohydrin polymers in accordance with this invention and the vulcanizates so obtained. All parts and percentages are by weight unless otherwise indicated.

GENERAL PROCEDURE FOR PREPARATION OF VULCANIZATES

In all of the examples, polymer stocks are made up by mixing on a two-roll mill (rolls maintained at about 150°F.) one hundred parts of dry polymer with the specified cross-linking agents and any other additives for about ten minutes. The polymer is first added to the mill and when it bands, the other ingredients are added in the general order: lubricant, followed by filler, followed by antioxidant, followed by metallic stabilizer, followed by cross-linker. Where recipes indicate omissions, the order of addition is merely advanced. The resulting polymer stocks are cross-linked by one of two methods:

1. In an oscillating disk rheometer (as described in ASTM D-2705-68T) at a temperature of 320°F. The extent of cross-linking is indicated by the inch-pounds of torque required to twist the sample. Completion of cross-linking is characterized by the maximum inch-pounds of torque recorded when plotted against time.

2. In two-part steel molds under 100 p.s.i. minimum pressure. Specimen thickness is approximately 75 mils. The properties of the resulting vulcanizate are given in terms such as modulus, tensile strength, elongation at break, Shore hardness and compression set.

EXAMPLES 1 AND 2

These examples illustrate cross-linking an epihalohydrin polymer with polycarboxylate polyanions resulting from a polycarboxylic acid, a lead compound and a quaternary ammonium halide.

In each example, epichlorohydrin homopolymer having an RSV of approximately 1.8 is milled and cross-linked in two-part steel molds for 30 minutes at 320°F. with azelaic or isophthalic acid and tetrabutylammonium bromide.. The amounts of the ingredients (by parts) in the formulation and the physical properties of the vulcanizates are tabulated below:

| Ingredients | Examples 1 | 2 | Comparators a | b | c | d |
|---|---|---|---|---|---|---|
| Polyepichlorohydrin | 100 | 100 | 100 | 100 | 100 | 100 |
| Sorbitan monostearate (Lubricant) | 1 | 1 | 1 | 1 | 1 | 1 |
| Fast extruding furnace black | 50 | 50 | 50 | 50 | 50 | 50 |
| Nickel dibutyl dithiocarbamate (Antioxidant) | 1 | 1 | 1 | 1 | 1 | 1 |
| Red lead | 5 | 5 | 5 | 5 | — | — |
| Azelaic acid | 2 | — | 2 | — | 2 | — |
| Isophthalic acid | — | 1 | — | — | — | — |
| Tetrabutylammonium bromide | 4 | 3.2 | — | 4 | 4 | — |
| Physical Properties | | | | | | |
| Modulus at 100% (p.s.i.) | 1 | 2 | a | b | c | d |
| Unaged | 780 | 770 | 100 | 100 | 100 | 100 |
| Aged* | 1730 | 1945 | 100 | 100 | 100 | 100 |
| Tensile Strength (p.s.i.) | | | | | | |
| Unaged | 1835 | 1640 | 100 | 100 | 100 | 100 |
| Aged* | 1945 | 1945 | 100 | 100 | 100 | 100 |
| Maximum Elongation (%) | | | | | | |
| Unaged | 275 | 280 | 400 | 400 | 400 | 400 |
| Aged* | 115 | 100 | 400 | 400 | 400 | 400 |
| Shore A Hardness | | | | | | |
| Unaged | 72 | 70 | 27 | 27 | 27 | 27 |
| Aged* | 82 | 85 | 25 | 25 | 25 | 25 |
| Compression Set (%) | | | | | | |
| 70 hours at 257°F. | 64 | 92 | 100 | 100 | 100 | 100 |

*3 days at 302°F. in air.

EXAMPLE 3

This example illustrates cross-linking an epihalohydrin copolymer with a polycarboxylate polyanion resulting from a polycarboxylic acid, a lead compound and a quaternary ammonium halide.

An epichlorohydrin--ethylene oxide copolymer having an RSV of approximately 3.0 and containing epichlorohydrin and ethylene oxide in a mole ratio of 50:50 is milled and cross-linked in a two-part steel mold at 320°F. for 30 minutes with azelaic said, red lead and tetrabutylammonium bromide. The amounts of the ingredients (by parts) in the formulation and the physical properties of the vulcanizate are tabulated below:

| | Example 3 | Comparator |
|---|---|---|
| Epichlorohydrin-ethylene oxide copolymer | 100 | 100 |
| Sorbitan monostearate (lubricant) | 1 | 1 |
| Fast extruding furnace black | 50 | 50 |
| Nickel dibutyl dithiocarbamate (antioxidant) | 1 | 1 |
| Red lead (stabilizer) | 7.5 | 7.5 |
| Azelaic acid | 1 | — |
| Tetrabutylammonium bromide | 6.4 | — |

EXAMPLES 4-11

These examples illustrate cross-linking an epihalohydrin polymer with polycarboxylate polyanions resulting from a polycarboxylic acid, a lead compound and a quaternary ammonium halide.

In each example epichlorohydrin homopolymer having an RSV of approximately 1.8 is milled and cross-linked in two-part steel molds for 60 minutes at 320°F. The amounts of the ingredients (by parts) in the formulation and the physical properties of the vulcanizate are tabulated below:

| Ingredients | 4 | 5 | 6 | Examples 7 | 8 | 9 | 10 | 11 | Comparator A |
|---|---|---|---|---|---|---|---|---|---|
| Polyepichlorohydrin | 100 | 100 | 100 | 100 | 100 | 100 | 100 | 100 | 100 |
| Sorbitan monostearate | 1 | 1 | 1 | 1 | 1 | 1 | 1 | 1 | 1 |
| Fast extruding furnace black | 50 | 50 | 50 | 50 | 50 | 50 | 50 | 50 | 50 |
| Nickel dibutyl dithiocarbamate | 1 | 1 | 1 | 1 | 1 | 1 | 1 | 1 | 1 |
| Red lead | 7.5 | 7.5 | 7.5 | 7.5 | 7.5 | 7.5 | 7.5 | 7.5 | 7.5 |
| 1,4-Cyclohexane dicarboxylic acid | 1.7 | — | — | — | — | 20 | 1.7 | 1.7 | — |
| 3-Carboxy-3-methyl adipic acid | — | 1.5 | — | — | — | — | — | — | — |
| 1,2,3,4-Cyclopentane tetracarboxylic acid | — | — | 2.5 | 5.0 | 10 | — | — | — | — |
| Tetrabutylammonium bromide | 3.2 | 3.2 | 3.2 | 6.4 | 6.4 | 20 | — | — | 3.2 |
| Tetrabutylammonium chloride | — | — | — | — | — | — | 2.8 | — | — |
| Tetrabutylammonium iodide | — | — | — | — | — | — | — | 3.7 | — |

Physical Properties

| | 4 | 5 | 6 | 7 | 8 | 9 | 10 | 11 | A |
|---|---|---|---|---|---|---|---|---|---|
| Modulus at 100% (p.s.i.) | | | | | | | | | |
| Unaged | 930 | 850 | 800 | 1250 | 1850 | — | 825 | 1140 | 150 |
| Aged* | 1340 | 1200 | 1450 | 1700 | 1600 | — | 1140 | 1500 | 300 |
| Tensile Strength (p.s.i.) | | | | | | | | | |
| Unaged | 2250 | 1950 | 2000 | 2450 | 1900 | 2100 | 2150 | 2420 | 200 |
| Aged* | 2100 | 2300 | 2200 | 2200 | 1600 | 1900 | 2300 | 2200 | 300 |
| Maximum Elongation (%) | | | | | | | | | |
| Unaged | 370 | 420 | 400 | 230 | 120 | 10 | 410 | 250 | 400 |
| Aged* | 200 | 220 | 210 | 150 | 100 | 10 | 200 | 180 | 380 |
| Shore A Hardness | | | | | | | | | |
| Unaged | 70 | 68 | 68 | 84 | 100 | 100 | 68 | 75 | 30 |
| Aged* | 76 | 74 | 75 | 89 | 100 | 100 | 73 | 80 | 34 |
| Compression Set (%) | | | | | | | | | |
| 70 hours at 302°F. | 78 | 85 | 80 | 75 | 75 | 85 | 75 | 70 | 100 |

*3 days at 302°F. in air.

EXAMPLES 12 AND 13

These examples illustrate cross-linking an epihalohydrin polymer with a polycarboxylate polyanion resulting from a quaternary ammonium salt of a polycarboxylic acid.

In each example, the polyepichlorohydrin described in Examples 1 and 2 is milled and cross-linked in two-part steel molds for 30 minutes at 320°F. with bis(tetramethylammonium) azelate. The amounts of the ingredients (by parts) in the formulations and the physical properties of the vulcanizates are tabulated below:

| Ingredients | Examples 12 | — | Comparator |
|---|---|---|---|
| Polyepichlorohydrin | 100 | 100 | 100 |
| Sorbitan monostearate (lubricant) | 1 | 1 | 1 |
| Fast extruding furnace black | 50 | 50 | 50 |
| Nickel dibutyl dithiocarbamate (antioxidant) | 1 | 1 | 1 |
| CaO (stabilizer) | — | 5 | 5 |
| Bis(tetramethylammonium) azelate | 3.6 | 3.2 | — |
| Physical Properties | | | |
| Modulus at 100% (p.s.i.) | | | |
| Unaged | 1035 | 1140 | 100 |
| Aged* | 660 | 1410 | 100 |
| Tensile Strength (p.s.i.) | | | |
| Unaged | 2070 | 2040 | 100 |
| Aged* | 980 | 1960 | 100 |
| Elongation at Break (%) | | | |
| Unaged | 260 | 240 | 400 |
| Aged* | 200 | 140 | 400 |
| Shore A Hardness | | | |
| Unaged | 76 | 86 | 28 |
| Aged* | 72 | 82 | 32 |
| Compression Set (%) | | | |
| 70 hours at 257°F. | 34 | 20 | 100 |
| 70 hours at 302°F. | 86 | 50 | 100 |

*3 days at 302°F. in air.

EXAMPLE 14

This example illustrates cross-linking an epihalohydrin polymer with a polycarboxylate polyanion resulting from a quaternary ammonium salt of a polycarboxylic acid.

The polyepichlorohydrin described in Examples 1 and 2 is milled and cross-linked in two-part steel molds for 30 minutes at 320°F. with bis(tetrabutylammonium) azelate. The amounts of the ingredients (by parts) in the formulation and the physical properties of the vulcanizates are tabulated below:

| Ingredients | Example 14 | Comparator |
|---|---|---|
| Polyepichlorohydrin | 100 | 100 |
| Sorbitan monostearate (lubricant) | 1 | 1 |
| Fast extruding furnace black | 50 | 50 |
| Nickel dibutyl dithiocarbamate (antioxidant) | 1 | 1 |
| Red lead (stabilizer) | 5 | 5 |
| Bis(tetrabutylammonium) azelate | 2.5 | — |
| Physical Properties | | |
| Modulus at 100% (p.s.i.) | | |
| Unaged | 975 | 100 |
| Aged 10 days at 302°F. in air | 700 | 100 |
| Tensile Strength (p.s.i.) | | |
| Unaged | 2030 | 100 |
| Aged* | 1135 | 100 |
| Elongation at Break (%) | | |
| Unaged | 250 | 400 |
| Aged* | 90 | 400 |
| Shore A Hardness | | |
| Unaged | 68 | 28 |
| Aged* | 74 | 32 |
| Compression Set (%) | | |
| 70 hours at 257°F. | 42 | 100 |
| 70 hours at 302°F. | 80 | 100 |

*3 days at 302°F. in air.

EXAMPLES 15–21

These examples illustrate cross-linking an epihalohydrin polymer with polycarboxylate polyanions resulting from quaternary ammonium salts of polycarboxylic acids.

In each example, the polyepichlorohydrin described in Examples 1 and 2 is milled and cross-linked in an oscillating disk rheometer with various quaternary ammonium salts. In each sample, 100 parts of the polymer is compounded with 1 part of sorbitan monostearate (lubricant), 50 parts of fast extruding furnace black, 1 part of nickel dibutyldithiocarbamate (antioxidant) and 0.01 mole of quaternary ammonium salt per 100 grams of polymer. The specific quaternary ammonium salt used and the inch-pounds of torque required to twist the sample after cross-linking 30 minutes at 320°F. is tabulated below:

| Example | Quaternary Ammonium Salt | Torque |
|---|---|---|
| Comparator | — | 8 |
| 15 | Bis(tetramethylammonium) azelate | 95 |
| 16 | Bis(tetramethylammonium) phthalate | 60 |
| 17 | Bis(tetramethylammonium) isophthalate | 42 |
| 18 | Bis(tetramethylammonium) maleate | 58 |
| 19 | Bis(ethyltrimethylammonium) phthalate | 90 |
| 20 | Bis(tetramethylammonium) adipate | 41 |
| 21 | Tetrakis(tetramethylammonium) 1,2,3,4-cyclopentanetetracarboxylate | 95 |

Polyester cord is placed between two sheets of the above polyepichlorohydrin rubber formulation and vulcanized in a two-part mold for 15 minutes at 320°F. Specimens having an H shape are cut from the resulting cord reinforced sheets and tested for force required to separate specimen (American Standard Testing Method No. D-2138-67) and to determine if the rubber adheres to the cord. The specific polyester cords used and the results of the tests are tabulated below:

| Polyester Cord | Example 28 | | Comparator | |
|---|---|---|---|---|
| | H-test (lbs. of force) | Rubber Adheres | H-test (lbs. of force) | Rubber Adheres |
| Polyethyleneterephthalate[1] | 40 | yes | 18 | no |
| High carboxyl polyethyleneterephthalate[2] | 37 | yes | 18 | no |
| Poly(1,4-cyclohexylene-dimethyleneterephthalate[3] | 42 | yes | 18 | no |

[1]Sold by Du Pont and designated T-68.
[2]Sold by Celanese under the trade name "Fortrel".
[3]Sold by Eastman Kodak under the trade name "Kodel II".

EXAMPLES 22-27

These examples illustrate cross-linking an epihalohydrin polymer with polycarboxylate polyanions resulting from an alkali metal salt of a polycarboxylic acid and a quaternary ammonium salt of a polycarboxylic acid.

In each example, the polyepichlorohydrin described in Examples 1 and 2 is milled and cross-linked in an oscillating disk rheometer with various alkali metal and quaternary ammonium salts of azelaic acid. The amounts of the ingredients (by parts) in the formulation and the inch-pounds of torque required to twist the sample after cross-linking 30 minutes at 320°F. is tabulated below:

| Ingredients | 22 | 23 | 24 | Examples 25 | 26 | 27 | Comparator A |
|---|---|---|---|---|---|---|---|
| Polyepichlorohydrin | 100 | 100 | 100 | 100 | 100 | 100 | 100 |
| Sorbitan monostearate | 1 | 1 | 1 | 1 | 1 | 1 | 1 |
| Fast extruding furnace black | 50 | 50 | 50 | 50 | 50 | 50 | 50 |
| Nickel dibutyldithiocarbamate | 1 | 1 | 1 | 1 | 1 | 1 | 1 |
| Red lead | 5 | 5 | 5 | 5 | 5 | 5 | 5 |
| Dipotassium azelate | 0.6 | 0.9 | 1.8 | 3.0 | 3.0 | — | 2.2 |
| Disodium azelate | — | — | — | — | — | 1.6 | — |
| Bis(tetrabutylammonium) azelate | 1.4 | 1.4 | 1.4 | 0.9 | 0.9 | 1.4 | — |
| Mole % of quaternary ammonium salt | 50 | 40 | 25 | 10.5 | 10 | 25 | — |
| Torque (inch-pounds) | 92 | 92 | 109 | 84 | 80 | 84 | 8 |

EXAMPLE 28

This example illustrates the bonding of an epihalohydrin polymer to a polyester using a quaternary ammonium salt of polycarboxylic acid.

The polyepichlorohydrin described in Examples 1 and 2 is milled with the following ingredients:

| Ingredients | Example 28 | Comparator |
|---|---|---|
| Polyepichlorohydrin | 100 | 100 |
| Sorbitan monostearate | 1 | 1 |
| Fast extruding furnace black | 50 | 50 |
| Nickel dibutyldithiocarbamate | 1 | 1 |
| Red lead | 5 | 5 |
| 2-Mercaptoimidazoline | — | 1.0 |
| Bis(tetrabutylammonium) azelate | 6.7 | — |

What I claim and desire to protect by Letters Patent is:

1. The process of cross-linking a polymer of an epihalohydrin which comprises heating said polymer in the presence of from about 0.0025 gram mole to about 1.0 gram mole per 100 grams of polymer of at least one agent which yields a polycarboxylate polyanion having the formula

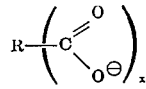

where R is a radical selected from the group consisting of phenylene, alkylene, cycloalkylene and the hydrocarbon radical remaining after the removal of the carboxylic acid groups from the dimer and trimer acids of diunsaturated fatty acids and $x$ is an integer from 2 to 4.

2. The process of claim 1 wherein the polycarboxylate polyanion is formed in situ from a mixture of 1. a polycarboxylic acid having the formula

where R is a radical selected from the group consisting of phenylene, alkylene, cycloalkylene and the hydrocarbon radical remaining after the removal of the carboxylic acid groups from the dimer and trimer acids of diunsaturated fatty acids and $x$ is an integer from 2 to 4.

2. about one mole per mole of carboxyl group of a quaternary ammonium halide having the formula $$X^- N(R')_4$$

where X is a halide radical and R' is a hydrocarbon group selected from alkyl and cycloalkyl, and 3. from about 0.1% to about 20% by weight based on the polymer of a lead compound selected from the lead salts of aromatic carboxylic acids, the lead salts of aliphatic carboxylic acids, the lead salt of carbonic acid, the lead salt of phosphorous acid, the lead salt of silicic acid and the lead oxides.

3. The process of claim 2 wherein the polycarboxylic acid is azelaic acid and the quaternary ammonium halide is tetrabutylammonium bromide.

4. The process of claim 1 wherein the polycarboxylate polyanion is formed in situ from a quaternary ammonium salt of a carboxylic acid having the formula

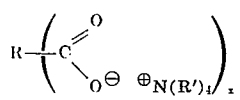

where R is a radical selected from the group consisting of phenylene, alkylene, cycloalkylene, and the hydrocarbon radical remaining after the removal of the carboxylic acid groups from the dimer and trimer acids of diunsaturated fatty acids, R' is a hydrocarbon group selected from alkyl and cycloalkyl, and $x$ is an integer from 2 to 4.

5. The process of claim 4 wherein the quaternary ammonium salt of a carboxylic acid is tetramethylammonium azelate.

6. The process of claim 4 wherein the quaternary ammonium salt of a carboxylic acid is tetrabutylammonium azelate.

7. The process of claim 1 wherein the polycarboxylate polyanion is formed in situ from a mixture of 1. an alkali metal salt of a polycarboxylic acid having the formula $$R + COOM)_x$$

wherein R is a radical selected from the group consisting of phenylene, alkylene, cycloalkylene and the hydrocarbon radical remaining after the removal of the carboxylic acid groups from the dimer and trimer acids of diunsaturated fatty acids, M is an alkali metal and $x$ is an integer from 2 to 4, and 2. from about 10 mole % to about 50 mole %, based on the total moles of polyanion cross-linkers, of a quaternary ammonium salt of a polycarboxylic acid having the formula

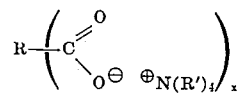

where R is a radical selected from the group consisting of phenylene, alkylene, cycloalkylene and the hydrocarbon radical remaining after the removal of the carboxylic acid groups from the dimer and trimer acids of diunsaturated fatty acids, R' is a hydrocarbon group selected from alkyl and cycloalkyl, and $x$ is an integer from 2 to 4.

8. A cross-linked polymer of an epihalohydrin prepared by heating a solid polymer of an epihalohydrin having a reduced specific viscosity of above about 0.2 in the presence of at least one agent which yields a polycarboxylate polyanion having the formula

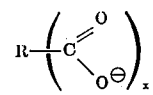

where R is a radical selected from the group consiting of phenylene, alkylene, cycloalkylene and the hydrocarbon radical remaining after the removal of the carboxylic acid groups from the dimer and trimer acids of diunsaturated fatty acids, and $x$ is an integer from 2 to 4.

* * * * *

UNITED STATES PATENT OFFICE
CERTIFICATE OF CORRECTION

PATENT NO. : 3,875,122
DATED : April 1, 1975
INVENTOR(S) : Joseph E. Mirolli

It is certified that error appears in the above-identified patent and that said Letters Patent are hereby corrected as shown below:

In the abstract, line 2 of printed patent;
    "polycarboxyplate" should read --polycarboxylate--

Column 8, line 40 of printed patent; Page 14 of spec.;
    Complete table missing, see attached table Column 9, line 33 of printed patent;
    No. "13" missing under Examples Column 14, line 39 (in the claims) of printed patent;
    "consiting" should read --consisting--

UNITED STATES PATENT OFFICE
CERTIFICATE OF CORRECTION

Patent No. 3,875,122      Dated April 1, 1975

Inventor(s) Joseph E. Mirolli      Page - 2

It is certified that error appears in the above-identified patent and that said Letters Patent are hereby corrected as shown below:

Physical Properties

|  | Example 3 | Comparator |
|---|---|---|
| Modulus at 100% (p.s.i.) | | |
| Unaged | 515 | 100 |
| Aged* | 780 | 300 |
| Tensile Strength (p.s.i.) | | |
| Unaged | 1635 | 100 |
| Aged* | 825 | 300 |
| Maximum Elongation (%) | | |
| Unaged | 430 | 400 |
| Aged* | 105 | 800 |
| Shore A Hardness | | |
| Unaged | 61 | 28 |
| Aged* | 74 | 34 |
| Compression Set | | |
| 70 hours at 302°F. | 100 | 100 |

*3 days at 302°F. in air.

Signed and sealed this 27th day of May 1975.

(SEAL)
Attest:

RUTH C. MASON
Attesting Officer

C. MARSHALL DANN
Commissioner of Patents
and Trademarks